United States Patent [19]

Araki et al.

[11] 3,855,379

[45] Dec. 17, 1974

[54] NOVEL POLYBUTADIENE DERIVATIVE CURABLE WITH IONIZING RADIATION

[75] Inventors: Kunio Araki; Takashi Sasaki; Keiji Nishio, all of Takasaki, Japan

[73] Assignee: Japan Atomic Energy Research Institute, Tokyo, Japan

[22] Filed: Feb. 29, 1972

[21] Appl. No.: 230,486

[30] Foreign Application Priority Data

Mar. 4, 1971   Japan.............................. 46-10964

[52] U.S. Cl.................. 260/77.5 CR, 117/132 B, 117/132 CB, 204/159.19, 204/159.2, 260/17.4 BB, 260/37 N, 260/94.7 N, 260/859 R, 260/879

[51] Int. Cl............................................ C08g 22/00

[58] Field of Search.... 260/77.5 CR, 77.5 AT, 85.1, 260/94.7 N; 204/159.19, 159.2

[56] References Cited

UNITED STATES PATENTS

| | | | |
|---|---|---|---|
| 3,431,235 | 3/1969 | Lubowitz...................... | 260/77.5 CR |
| 3,468,923 | 9/1969 | Koenig et al. ............... | 260/77.5 AT |
| 3,654,336 | 4/1972 | Krimm et al. ............... | 260/77.5 AT |

*Primary Examiner*—M. J. Welsh
*Attorney, Agent, or Firm*—Stevens, Davis, Miller & Mosher

[57] ABSTRACT

A novel polybutadiene derivative is prepared substantially by reacting a polymeric butadiene containing at least about 30% of 1,2-bond and a functional group having an active hydrogen with an isocyanate compound having a vinyl group. The derivative is readily cured by means of an ionizing radiation, and is useful for molding, coating, bonding and the like.

8 Claims, No Drawings

NOVEL POLYBUTADIENE DERIVATIVE CURABLE WITH IONIZING RADIATION

DETAILED EXPLANATION OF THE INVENTION

The present invention relates to a process for preparing a novel radiation-curing polymeric compound, which substantially comprises reacting a butadiene homopolymer, a butadiene copolymer or a mixture thereof which have functional groups containing active hydrogen in its molecule, with an isocyanate compound having substituted or unsubstituted vinyl group. The principal objects of the present invention are; (1) to provide resin materials with high flexibility, which is susceptible to radiation, that is, which is curable with the irradiation of low radiation dose, (2) to provide a raw materials for paint composition which results in the painted films having excellent flexibility, shock resistance and adhesive properties, and (3) to provide raw materials for use as bonding agents with excellent adhesive strength at high temperature. Moreover, the applications as raw materials in resin-fiber composites, as fiber conditioning agents, artificial leather and the like are contemplated.

It has been known that thermo-setting resin, film forming paint material, bonding agents and the like can be produced by polymerizing a butadiene polymer having a molecular weight of 200 – 100,000 under heating in the presence of curing agent such as an organic peroxide and various curing accelerators. However, in the production of cured resin produced from such butadiene polymer as raw material, the working propery property quite low and industrial mass production is difficult or impossible, because the heat curing requires a temperature above 150°C for a long period ranging to several days, and from more than several hours even with use of a curing accelerator. Furthermore, such processes have the disadvantages in that the pot life is limited when a curing agent comprising organic peroxide or curing accelerator is mixed with the polymer, and the cured resin has poor flexiblity and is occasionally cracked.

Moreover, the application of such paint composition prepared from butadiene polymer has been restricted to the materials which withstand heating, and the application to wood board, plywood, plastics, fiber or the like has been considered to be impossible. The painted film has poor shock resistance and poor adhesive properties, and the bounding agent has poor adhesion to metallic material.

As the result of the many studies involving the methods of preparing resins, paint compositions and bonding agents in which butadiene polymers are used as raw materials seeking to improve the properties of such products; the present inventors have achieved the present invention by discovering that the disadvantages mentioned above are considerably improved when a novel polybutadiene derivative, which is obtained by the reaction of an isocyanate compound containing substituted or unsubstituted vinyl groups with a butadiene polymer which has functional groups containing active hydrogen, is used as raw material for radiation-curing resin, and that it is possible to provide curable resins, paint compositions and bonding agents with high flexibility which are curable at room temperature in a short period of time without addition of curing agent such as organic peroxide or various kinds of curing accerelators.

The present invention is explained below more concretely. The invention relates to a method of preparing novel radiation-curing polybutadiene derivatives, in which butadiene homopolymers, butadiene copolymers or their mixtures having the number-average molecular weight of approximately 200 – 100,000, having more than about 30% of butadiene unit of 1.2-bond in its polymerized chain and having functional groups containing active hydrogen (these polymers are defined hereinafter as "butadiene polymer containing active hydrogen"), are allowed to react with an isocyanate compound having substituted or unsubstituted vinyl group (these compounds are defined hereinafter as "isocyanate compounds containing substituted or unsubstituted vinyl group") in the ratio of more than about 0.5 equivalent, preferably 0.8 – 1.2 equivalent, of isocyanate groups in the latter to one equivalent of active hydrogen in the former. The order of the processes to produce the above mentioned derivatives in the present invention is not restricted, therefore, changes and modifications of the reaction processes, in which, for instance, an isocyanate compound without a vinyl group is allowed to react with a butadiene polymer to form the derivative at the beginning and subsequently the vinyl group is introduced into the derivative, fall under the present invention as a matter of course.

The analysis of the mechanism for the unexpected excellent effect by introducing above mentioned each functional group into the novel radiation-curing polybutadiene derivatives in the present invention is in progress, whereas it is understood that reasonable flexibility, adhesiveness and luster are given to resins, paint compositions and bonding agents by urethane-, urea-, amide-bond and the like which result from the reaction between the functional group containing active hydrogen in the butadiene polymers and the isocyanate group, and furthermore the reactivity (curable ability by irradiation) of the derivative is increased by the presence of the vinyl group in the isocyanate compound, consequently advantageous effects, that is, reduction of the radiation dose required for curing, increase in the hardness of the painted film and the like are achieved. Moreover, the coexistence of the above effects is a requisite condition to attain the expected objects. Butadiene polymer having 1.2-bond, moreover, contains pendant reactive vinyl groups in its molecular structure, whereas it is considered that the unsubstituted or substituted vinyl groups in the isocyanate compounds are more reactive than the pendant vinyl groups mentioned above and result in a synergystic effect in which the intermolecular cross-linking reaction is effectively carried out during the process of radiation curing, particularly at the initial stage of the process. Particularly, the effect tends to be more considerable when an electrophilic group such as carbonyl group is bonded to the α-carbon to which vinyl group is attached.

DESCRIPTION OF THE PREFERRED EMBODIMENTS

The butadiene polymer containing active hydrogen used in the present invention means the butadiene polymer with number-average molecular weight of 200 – 100,000, butadiene copolymers containing butadiene units of more than about 50 percent, and their mixtures, the butadiene polymer containing active hydrogen such as provided by hydroxyl-, carboxyl-, mercapto-, amino group or the like, in its polymeric chain. The butadiene polymers mentioned above, for instance, include the following polymers: butadiene polymers and copolymers of butadiene with isoprene prepared by means of anionic polymerization using metallic sodium as a catalyst, and copolymers of butadiene with other comonomer in which functional group mentioned above is introduced; butadiene polymers prepared by means of anionic polymerization using a nonpolar solvent comprising hydrocarbon series in the presence of lithium or organic lithium as a catalyst and copolymers of butadiene with other comonomer in which the functional group previously mentioned is introduced; stereo regular butadiene polymer prepared in the presence of a coordination anoinic polymerization catalyst, copolymers of butadiene with other comonomer in the presence of a radical catalyst containing functional group such as carboxyl group and butadiene polymers formed by reduction of the above polymer to introduce hydroxyl group in its polymerized chain; the butadiene homopolymers obtained by teating a reaction mixture prepared by means of anionic living-polymerization of butadiene or mixture comprising butadiene and diluent, in the system containing a Lewis basic compound such as tetrahydrofuran and an alkali metal such as lithium and sodium, with an electrophilic agent such as ethylene oxide, propylene oxide, carbon dioxide and ethylene sulfide in the presence or the absence of an activator comprising aromatic hydrocarbon such as naphthalene and 1,2-diphenylbenzene, and the butadiene copolymer obtained by treating a mixed solution formed by anionic living-polymerization, in which comonomer comprising butadiene and isoprene, comonomer comprising butadiene and styrene or a mixture comprising these monomers and diluent is added from the start or gradually into the system previously mentioned; and the partly oxidized butadiene polymer in which functional group, such as hydroxyl — or carboxyl group, is introduced into a part of polymerized chain by oxidizing butadiene polymer, without functional group containing active hydrogen, using air or oxygen in the presence of a catalyst and solvent. The use of alkali metal complex as a polymerization initiator is particularly preferable because of high ratio of 1,2-bond in the polymer. Moreover, the number of functional groups per unit molecule should be preferably not more than three from the view point of the viscosity and the prevention of gelation of reaction product, therefore, attention should be paid to the above when the functional group is introduced into polymers by partial oxidation mentioned above.

The number-average molecular weight of the butadiene polymer usable for the above object is in the range of about 200 – 100,000 and preferably about 200 – 20,000, taking into account the working property at room temperature. When the molecular weight is less than about 200, the ratio of butadiene polymer as a component to the formed polybutadiene derivative is relatively lowered and the characteristics as polybutadiene, that is, capacity for of electric insulation, thermal resistance, water resistance and chemical resistance of the products such as radiation curing resins, paint compositions and bonding agents, are reduced; and when the molecular weight is larger than 20,000, the working property at room temperature is reduced because of increase in the viscosity. It is preferable to carry out the present invention for the resin having the molecular weight of more than 20,000, usually under heating.

Butadiene polymers are structually classified into two types, that is, 1,2-bond type in which each butadiene unit as fundamental constituent has vinyl group branched and 1,4-bond type having intermolecular double bond, and the ratio of these types in the polymer is varied according to polymerization method. The butadiene polymer in the present invention is required to have 1,2-bond of more than about 30 percent, preferably more than about 50 percent, and when it is less than 30 percent, it is difficult to obtain hardened resin and painted film with expected hardness and adhesion with sufficient strength, because of lower degree of crosslinking.

Comonomers used for copolymers involve styrene, α-methyl styrene, isoprene, acrylonitrile, ethyl acrylate, methyl vinyl ketone, methyl methacrylate and the like, and the preferred comonomer is styrene.

Isocyanate compounds containing substituted or unsubstituted vinyl group in the present invention include compounds in which vinyl group and isocyanate group are directly bonded to the main chain or ring of the structure of the compound as well as compounds which are obtained by chemically combining a compound having isocyanate group with another compound having substituted or unsubstituted vinyl group through a suitable functional group. More varieties of compound for this purpose are generally obtained in the latter than in the former and it is easy to provide suitable compounds according to requirements. The number of vinyl groups and isocyanate group per one molecule of the above mentioned compound is not so restricted, but, in general, a compound containing one or two of each group in its molecule is preferable and the substituent in the substituted vinyl group contains a lower alkyl group, phenyl group, halogen and the like.

Preferable examples of the compounds in which vinyl groups and isocyanate groups are directly bonded to the main chain or ring, include vinyl isocyanate, vinyl phenyl isocyanate, vinyl phenyl diisocyanate, allyl isocyanate, 2-butene-1.4-diisocyanate, trans-vinylene diisocyanate and the like. Compound, which are obtained by chemically combining a compound having isocyanate group with another compound having vinyl group through a functional group, are synthesized, for instance, by reacting a polyisocyanate compound with another compound in which both of vinyl group and functional group containing active hydrogen are contained in its molecule. Polyisocyanate compounds used for such reactions include, for instance, lower aliphatic polyisocyanates such as ethylene diisocyanate, ethylidyne diisocyanate, propylene diisocyanate, butylene diisocyanate and hexamethylene diisocyanate; alicyclic polyisocyanates such as cyclopentylene diisocyanate, cyclohexylene diisocyanate and the like; aromatic polyisocyanates such as 2.4-toluylene diisocyanate, 2.6-toluylene diisocyanate, 4.4'-diphenylmethane diisocyanate, 2.2'-diphenylpropane-4.4'-diisocyanate, 3.3'-dimethyldiphenylmethane-4.4'-diisocyanate, p- or m-phenylene diisocyanate, naphthylene diisocyanate, pyrene diisocyanate, chrysene diisocyanate, nitrodiphenyl diisocyanate, 1-methylbenzene-2,4,6-triisocyanate, 1,3-xylylene diisocyanate, 1.4-xylylene diisocyanate and the like; and mixtures thereof. Moreover, compounds, in which both of vinyl group and functional group containing active hydrogen are contained in its molecule, include alcohols such as allyl alcohol, methallyl alcohol, cinnamon alcohol and the like; phenols such as vinyl phenol and the like; aliphatic carboxylic acids such as acrylic acid, methacrylic acid, cinnamic acid, crotonic acid and the like; $\alpha,\beta$-unsaturated dicarboxylic monoesters such as maleic monoester, fumaric monoester and the like; aromatic carboxylic acids such as p-vinyl benzoic acid and the like; acid amides such as acrylamide, methacrylamide, maleamide anhydride and the like; amines such as 2-amino ethylvinyl ether, vinyl aniline and the like; acrylic esters such as 2-hydroxyethyl acrylate, 2-hydroxypropyl acrylate, hydroxybutyl acrylate, 2-carboxypropyl acrylate and the like; acrylic amides such as 2-aminoethylacrylic amide, 2-aminopropylacrylic amide and the like; methacrylic esters such as 2-hydroxyethyl methacrylate, 2-hydroxypropyl methacrylate, hydroxybutyl methacrylate, 2-carboxypropyl methacrylate and the like; and methacrylic amides such as 2-aminoethyl methacrylic amide, 2-aminopropyl methacrylic amide and the like.

In these materials mentioned above, polybutadiene derivatives which are obtained from the reaction product formed by allowing to react diisocyanates with compounds such as acrylic ester, acrylic amide, methacrylic ester and methacrylic amide, in which electrophilic group is bonded to $\alpha$-carbon to be bonded by vinyl group, are preferable raw materials, which are very susceptible to radiation curing, for instance, are curable with low radiation dose of 0.5 – 3 Mrad.

The reaction mentioned above, between the compound containing isocyanate group and another compound containing both vinyl group and functional group containing active hydrogen, is carried out by mixing both compounds in the ratio of not less than about 1.1 equivalent of isocyanate group in the latter, preferably of 1.5 – 2.5 equivalent, to one equivalent of active hydrogen in the former and by heating to temperature below 150°C, preferably at 50° – 100°C, for 0.5 – 6 hours, if desired in the presence of solvent and catalyst for acceleration.

The novel radiation-curable polybutadiene derivative according to the present invention is produced by allowing to react the above mentioned butadiene polymer containing active hydrogen with the isocyanate compound containing substituted or unsubstituted vinyl group in the ratio of not less than about 0.5 equivalent of isocyanate group in the latter, preferably of 0.8 – 1.2 equivalent, to one equivalent of active hydrogen in the former, with heating to a temperature below 150°C, preferably at 50°–100°C, under stirring for 0.5 – 10 hours, if desired in the presence of a solvent and a catalyst for acceleration. In the above reaction, when the ratio of isocyanate to one equivalent of active hydrogen is less than about 0.5 equivalent, the expected reaction product can not be obtained because the chemical bond caused by isocyanate group and vinyl group are not sufficiently introduced into butadiene polymer, and when the ratio is too high, undesirable phenomena such as increase in the viscosity and solidification of the reaction product sometimes result by the reaction of free isocyanate group with the moisture in the atmosphere.

Solvents used in the above process when desired, contain aromatic vinyl compounds such as styrene, $\alpha$-methyl styrene and the like; acrylic or methacrylic esters such as ethyl acrylate, methyl methacrylate and the like; fumaric diesters such as diethyl fumarate and the like; maleic diesters such as diethyl malate and the like; allyl compounds such as diallyl phthalate and the like; and mixtures thereof. These are suitable for the present purpose because these are vinyl compounds which can be blended with radiation curable resin, and the use of these solvents eliminate the removing process of themselves afterward. Moreover, when these solvents are used in paint together with other unpolymerizable solvent, the removing process of the latter can be eliminated. The catalyst used for the above purpose involves those of amine series, organic tin and the like which are usually used in the reactions which prepare urethanes.

The typical modes of practice are given below:
Polybutadiene Derivatives for Cured Resins Radiation-curable polybutadiene derivatives by the present invention are used as the preferable raw materials for radiation curable resins, when these derivatives are prepared by the following processes. That is, the polybutadiene derivatives are synthesized by the reaction of the butadiene polymer containing active hydrogen and having the number-average molecular weight of 200 – 20,000, preferably 500 – 5,000, with the isocyanate compound containing substituted or unsubstituted group; and the derivatives are if desired mixed with vinyl compound and/or other polymers, followed by deairing; and the treatment is accomplished by irradiating the material with the total radiation dose of about 1 – 10 Mrad, for instance by the electron beam from an accelerator of the voltage of 2 MeV, the current of 1 mA and with the dose rate of 1 Mrad per one pass. In the above process, when the reaction product by the reaction of diisocyanates such as toluylene diisocyanate and the like, with acrylic esters such as hydroxyalkyl acrylate and the like, or methacrylic esters such as hydroxyalkyl methacrylate and the like, as the isocyanate compound containing substituted or unsubstituted vinyl group, are used as one of the reactant, the cured resin with excellent hardness is easily obtained by the irradiation of comparatively low radiation dose, for instance 0.5 – 5 Mrad.

The vinyl compound to be blended with radiation curable resin contains aromatic vinyl compounds such as styrene, $\alpha$-methyl stylene and the like, acrylic acid or its esters, methacrylic acid or its esters, fumaric diesters such as diethyl fumarate and the like, maleic diesters such as diethyl malate and the like and allyl compounds such as diallyl phthalate and the like, and is selected according to the property required by the use of the resin or the condition of radiation curing of the polymer. For instance, aromatic vinyl compounds, acrylic acid or acrylic esters, fumaric diesters or maleic diesters or the like are suitable for the requirement of mechanical strength; aromatic vinyl compounds or allyl compounds are for the requirement of electric property; and especially acrylic cid, methacrylic acid and the like are for the requirement of lowering of the radiation dose for curing; and the quantity of the compound to be blended is usually in the range of 10 – 70 percent of total quantity of resin.

Organic materials such as polyethylene, polybutadiene rubber, wood flour, $\alpha$-cellulose, plasticizer and the like and inorganic materials such as talc, kaolin, asbestos, glass fiber, calcium carbonate, carbon fiber and the like are used as fillers.

In the application of the present invention, the polybutadiene derivative can be used in admixture with other polymers such as unsaturated polyesters, epoxy resins, alkyd resins and the like, unless contrary to the purpose of the present invention.

The radiation-curable resin, in which the polybutadiene derivative by the present invention is applied, is not only curable with lower dose rate than a conventional polybutadiene resin, but the hardened resin has also excellent properties such as reasonable flexibility, high shock resistance, no cracking and the like, and is superior as the materials for electric insulation, construction and industries in the form of glass fiber, molded laminate, injection molded resin and press molded resin.

Polybutadiene derivatives for paint composition

When radiation-curable polybutadiene derivatives by the present invention is used for paint composition, these derivatives are prepared by the following processes. The radiation-curable polybutadiene derivative is synthesized by the reaction of the butadiene polymer containing active hydrogen and having the preferred number-average molecular weight of about 500 – 5,000, more preferably 1,000 – 3,000, with the isocyanate compound containing substituted or unsubstituted vinyl group. While the derivative is effective for the purpose by itself, if desired the same vinyl compound and/or other additives as used for the above mentioned radiation-curable resin are added to the derivative, and the mixture is sufficiently mixed. The curing of painted film can be carried out by the irradiation of electron beam with the radiation dose of 1 – 10 Mrad., hereby the resulting film has sufficient hardness and excellent characteristics of shock resistance, flexibility property, adhesivity and the like. The paint composition obtained by these processes is suitable for painting on steel plate, wood board, fiber and the like and as chemicals resistant paint composition, and particularly has an advantage in that the paint composition can be applied to the coated article which does not stand in heat treatment.

Polybutadiene derivatives for bonding agent

When radiation-curable polybutadiene derivatives by the present invention are used as bonding agent, these derivatives are prepared by the following processes. The radiation-curable polybutadiene derivative is synthesized by the reaction of the butadiene polymer containing active hydrogen and having the preferred number-average molecular weight of about 1,000 – 20,000, more preferably 2,000 – 10,000, with the isocyanate compound containing substituted or unsubstituted vinyl group; and the resulting polymer is mixed with the same vinyl compound and/or other additives as used for the above mentioned radiation-curable resin, then the mixture is sufficiently mixed. The adhesion is usually carried out with irradiation by electron beam with the radiation dose of 1 – 10 Mrad.

The bonding agent provided by the present invention has excellent adhesivity and flexibility, to the surface to be contacted, because of the presence of the polar group provided by isocyanate group, and intermolecular crosslinkage is present as a result of irradiation of low radiation dose because of the presence of substituted or unsubstituted vinyl group, and furthermore net structure is formed resulting in strong bonds between molecules because of the presence of the reactive branched vinyl group in the chain of the structure of butadiene polymer.

In the following descriptions, "parts" and "%" mean "parts by weight" and "weight percent" respectively unless otherwise designated. Preparations of the typical resins are illustrated in "Examples," and hardening of each resin and its excellent effect are described in "Test Examples."

EXAMPLE 1

Sodium was dispersed in tetrahydrofuran in which 1,2-diphenylbenzene was dissolved, and butadiene was added to the solution. After the above polymerized solution was treated by ethylene oxide, the polybutadienediol [A-1] was obtained by hydrolysis of the solution, which has the number-average molecular weight of 1,780, hydroxyl value of 49.8, ratios of 1,2-bond of 92.1 percent and of 1,4-trans-bond of 7.9 percent, and the viscosity of 10,800 c.p. at 45°C.

Moreover, 260 parts of 2-hydroxyethyl methacrylate ws allowed to react with 348 parts of toluylene diisocyanate for industrial use consisting of 80% of 2,4-toluylene diisocyanate and 20% of 2,6-toluylene diisocyanate, with stirring at 80°C for 3 hours, and 608 parts of the isocyanate compound containing vinyl group [B-1] was obtained.

Then, 2,270 parts of the above polybutadienediol [A-1] was allowed to react with 608 parts of above isocyanate compound [B-1] with stirring at 80°C for 4 hours, and 2,878 parts of polybutadiene derivative (a) was obtained. This derivative was light-yellowish sticky liquid and it was recognized by the analysis of infra-red absorption spectra that the isocyanate group in the reaction mixture was almost completely reacted. Using this derivative, radiation-curable resin, paint composition and bonding agent with preferred properties were obtained by the processes shown in Test Examples 1, 2 and 3.

EXAMPLE 2

The polybutadienediol [A-2], having the number-average molecular weight of 2,110, hydroxyl value of 37.6, ratios of 1,2-bond of 95.5 percent and of 1,4-trans-bond of 4.5 percent and the viscosity of 19,800 c.p. at 45°C, was produced by the same process as in Example 1. Further, 464 parts of the isocyanate compound containing vinyl group in its molecule [B-2] was produced by the reaction of 116 parts of allyl alcohol with 348 parts of toluylene diisocyanate for industrial use described in Example 1 with stirring at room temperature for 2 hours, at 80°C for 2 hours.

Subsequently, 3,414 parts of polybutadiene derivative (b) was obtained by the reaction of 2,950 parts of polybutadienediol [A-2] with isocyanate compound [B-2] with stirring at 80°C for 4 hours. This derivative was light-yellowish sticky liquid, and radiation-curable resin, paint composition and bonding agent with preferred properties were obtained by blending similar to that in Example 1.

EXAMPLE 3

476 parts of the isocyanate compound containing vinyl group in its molecule [B-3] was produced by the reaction of 348 parts of 2,4-toluylene diisocyanate with 172 parts of methacrylic acid with stirring in the atmosphere of nitrogen gas at room tempeature for 3 hours, furthermore at 80°C for 3 hours.

Subsequently, 3,426 parts of polybutadiene derivative (c) was obtained by the reaction of 2,950 parts of polybutadienediol [A-2] obtained in Example 2 with 476 parts of the above isocyanate compound [B-3] with stirring at 80°C for 4 hours. This derivative was light-yellowish sticky liquid, and radiation-curable resin, paint composition and bonding agent with preferred properties were obtained by blending similar to that in Example 1.

EXAMPLE 4

The polybutadienediol [A-3] having the number-average molecular weight of 1,380, hydroxyl value of 67.0, the viscosity of 11,500 c.p. at 45°C and ratios of 1,2-bond of 91.2 percent and of 1,4-trans-bond of 8.8 percent, was produced by the similar process to that in Example 1. 788 parts of isocyanate compound [B-4] containing vinyl group in its molecule was produced by the reaction of 288 parts of 2-hydroxypropyl methacrylate with 500 parts of diphenylmethane-4,4'-diisocyanate with stirring at 80°C for 4 hours.

Subsequently, 2,444 parts of polybutadiene derivative (d) was obtained by the reaction of 1,656 parts of polybutadienediol [A-3] with 788 parts of isocyanate compound [B-4] with stirring at 80°C for 3 hours. This derivative was light-yellowish sticky liquid, and radiation-curable resin, paint composition and bonding agent with preferable properties were obtained by blending similar to that in Example 1.

EXAMPLE 5

Sodium was dispersed in the system in which 1,2-diphenyl benzene was dissolved into tetrahydrofuran and butadiene was added thereto. The resulting polymerized solution was treated with carbon dioxide. By hydrolysing the above polymerized solution, polybutadiene dicarboxylic acid [A-4] having the number-average molecular weight of 2,350, acid value of 33.6, viscosity of 39,200 c.p. at 45°C and ratios of 1,2-bond of 90.9 percent and of 1,4-trans-bond of 9.1 percent, was produced.

Subsequently, after 3,297 parts of the above polybutadiene carboxylic acid [A-4] were allowed to react with 608 parts of the isocyanate compound [B-1] produced in Example 1 with stirring at 80°C until the generation of carbon dioxide gas stopped, 3,817 parts of polybutadiene derivative (e) was obtained.

This derivative was light-yellowish sticky liquid, and it was recognized by the analysis of infra-red absorption spectra that the isocyanate group in the reaction mixture was almost completely reacted. Radiation-curable resin, paint composition and bonding agent with preferred properties were obtained by blending similar to that in Example 1.

EXAMPLE 6

The polybutadienediol [A-5] having the number-average molecular weight of 2,980, hydroxyl value of 30.4, ratios of 1,2-bond of 92.5 percent and of 1,4-trans-bond of 7.5 percent and the viscosity of 43,000 c.p. at 45°C, was produced by the same process as in Example 1.

Subsequently, 1,985 parts of polybutadiene derivative (f) was obtained by the reaction of 1,844 parts of the above polybutadienediol [A-5] with 145 parts of vinylphenyl isocyanate with stirring at 80°C for 4 hours. This derivative was light-yellowish sticky liquid, and radiation-curable resin, paint composition and bonding agent with preferred properties by blending similar to that in Example 1.

EXAMPLE 7

647 parts of isocyanate compound containing vinyl group in its molecule [B-5] was produced by the reaction of 415 parts of triphenylmethane-4,4',4''-triisocyanate with 232 parts of 2-hydroxyethyl acrylate with stirring at room temperature for 2 hours, furthermore at 80°C 2 hours.

Subsequently, 2,139 parts of polybutadiene derivative (g) was obtained by the reaction of 1,492 parts of polybutadienediol [A-2] produced in Example 2 with 647 parts of the above isocyanate compound [B-5] with stirring at 80°C for 4 hours. This derivative was light-yellowish sticky liquid, and radiation-curable resin, paint composition and bonding agent with preferred properties were obtained by blending similar to that in Example 1.

EXAMPLE 8

Sodium was dispersed in the system in which 1,2-diphenylbenzene was dissolved into tetrahydrofuran and the mixture of butadiene with styrene was added to the system. By treating the polymerized solution resulting from the above process with ethylene oxide; the butadiene-styrene copolymer [A-6] having hydroxy groups was obtained, having the number-averge molecular weight of 2,250, hydroxyl value of 39.9 and butadiene unit ratio of 75.5 percent and styrene unit ratio of 24.5 percent respectively in the polymer chain, and the ratios of 1,2-bond of 65.8 percent, of 1,4-trans-bond of 23.3 percent and of 1,4-cis-bond of 10.9 percent in the residual butadiene group.

Subsequently, 3,270 parts of polybutadiene derivative (h) was obtained by the reaction of 2,815 parts of the above copolymer [A-6] with 464 parts of the isocyanate compound containing vinyl group [B-2] described in Example 2 with stirring at 80°C for 4 hours. This derivative was light-yellowish sticky liquid, and radiationcurable resin, paint composition and bonding agent with preferred properties were obtained by blending similar to that in Example 1.

Preparation of resins for controls

Sodium was dispersed in the system in which 1,2-diphenylbenzene was dissolved into tetrahydrofuran and butadiene was added to the system. By treating with water and hydrolizing the polymerized solution resulting from the above process, polybutadiene [A-7] with the number-average molecular weight of 4,190, concentrations of 1,2-bond of 92.4 percent and of 1,4-trans-bond of 7.6 percent, the viscosity of 81,250 c.p. and without functional group, was obtained and applicated in practical use in order to compare with other radiation curable resins.

Moreover, in the same way as [A-7], the polybutadiene, with the number-average molecular weight of 3,070, concentrations of 1,2-bond of 91.0% and of 1,4-trans-bond of 9.0 percent and the viscosity of 26,000 c.p. at 45°C, was produced and applicated in practical use in order to compare with other paint composition.

TEST EXAMPLE 1

The vinyl monomer as cross-linking agent shown in Table 1 was added to polybutadiene derivatives obtained in Example 1 – 8 as occasion demands. After deairing of these derivatives under reduced pressure, hardened resins were obtained by the irradiation of radiation.

Moreover, another hardened resin was obtained by irradiating the polybutadiene produced in "Manufacturing example for comparison" in the same way as the above. Blending compositions, conditions of radiation curing and results of property measurement of these radiation curing resin mentioned above are shown in Table 1.

As shown in Table 1, it is obvious that the radiation curing resin, obtained by the application of the polybutadiene derivative by the present invention, has widely advanced properties such as low radiation dose required for curing, prevention of cracking in molding processes, increase in bending strength and the like, compared to the radiation curing resin comprising only butadiene polymer.

TEST EXAMPLE 2

Clear varnish was prepared by adding 30 parts of ethylacrylate and 3 parts of acrylic acid into each 67 parts of polybutadiene derivatives obtained in Example 1 and 2 respectively. On the other hand, another clear varnish as reference example was prepared by the same blending as above with polybutadiene [A-8] obtained in "Manufacturing example for comparison."

After these varnish compositions were applied on the surface of polished steel plate respectively, hardening treatment by the irradiation of electron beam was carried out in the atmosphere of nitrogen gas. Results of the test are shown in Table 2.

As shown in Table 2, it is obvious that the painted film, obtained by the application of the butadiene derivative by the present invention, has widely advanced properties such as low radiation dose required for curing and improvement in mechanical characteristics such as bending strength, Du Pont shock resistance and the like, compared to the painted film comprising only butadiene polymer.

TEST EXAMPLE 3

Bonding agent was prepared by mixing 78 parts of polybutadiene (a) obtained in Example 1 with 20 parts of α-methylstyrene and 2 parts of acrylic acid. Moreover, another bonding agent was prepared by the same blending as above with polybutadiene [A-7] obtained in "Manufacturing example for comparison." After these bonding agent were applied on the surface of polished steel plate respectively, the surface was covered by a Mylar film with the thickness of 0.1 mm and followed by pressing the surface. Each bonding agent was hardened by means of irradiation of electron beam through above Mylar film. Results of the test for these bonding agents are shown in Table 3.

As shown in Table 3, it is obvious that the bonding agent, obtained by the application of the butadiene derivative by the present invention, has widely advanced properties such as large increase in its tensile shearing strength, compared to the bonding agent in which the adhesive property depend on the structure comprising only main chains of polybutadiene.

Table 1

| Test No. | | 1 | 2 | 3 | 4 | 5 |
|---|---|---|---|---|---|---|
| Polybutadiene Derivative | | a | b | c | d | e |
| Vinyl Compound | | Styrene 20% | | Methyl methacrylate 15% | Ethyl acrylate 20% | |
| Conditions of Irradiation | Voltage | 2 MeV | 2 MeV | 2 MeV | 2 MeV | 2 MeV |
| | Current | 1 mA | 5 mA | 1 mA | 2 mA | 2 mA |
| | Dose Rate | 0.1 Mrad/sec | 0.5 Mrad/sec | 0.1 Mrad/sec | 0.2 Mrad/sec | 0.2 Mrad/sec |
| | Linear Velocity | 4.5 cm/sec | 4.5 cm/sec | 4.5 cm/sec | 4.5 cm/sec | 4.5 cm/sec |
| | Distance between Radiation Source and Exposed Matter | about 20 cm | about 20 cm | about 20 cm | about 20 cm | about 20 cm |
| | Total Radiation Dose | 2.0 | 10.0 | 3.0 | 4.0 | 6.0 |
| Results of Test | Crack | no | no | no | no | no |
| | Appearance | light yellow, transparent | light yellow, transparent | light yellow, transparent | light yellow, transparent | light yellow, transparent |
| | Shore Hardness-D | 84 | 86 | 83 | 80 | 82 |
| | Bending Strength* | 950 kg/cm² | 790 | 1,150 | 690 | 820 |

| Test No. | | 6 | 7 | Reference Example 1 |
|---|---|---|---|---|
| Polybutadiene Derivative | | f | g | A-7 |
| Vinyl Compound | | Ethyleneglycol dimethacrylate 10% | | Ethyleneglycol dimethacrylate 20% |
| Conditions of Irradiation | Voltage | 2 MeV | 2 MeV | 2 MeV |
| | Current | 3 mA | 4 mA | 5 mA |
| | Dose Rate | 0.3 Mrad/sec | 0.4 Mrad/sec | 0.5 Mrad/sec |
| | Linear Velocity | 4.5 cm/sec | 4.5 cm/sec | 4.5 cm/sec |
| | Distance between Radiation Source and Exposed Matter | about 20 cm | about 20 cm | about 20 cm |
| | Total Radiation Dose | 6.0 | 8.0 | 25.0 |
| | Crack | no | no | yes |

Table 1 -Continued

| Test No. | | 6 | 7 | Reference Example 1 |
|---|---|---|---|---|
| Polybutadiene Derivative | | f | g | A-7 |
| Vinyl Compound | | Ethyleneglycol dimethacrylate 10% | | Ethyleneglycol dimethacrylate 20% |
| Results of Test | Appearance | light yellow, transparent | light yellow, transparent | light yellow, transparent |
| | Shore Hardness-D | 87 | 76 | 75 |
| | Bending Strength* | 760 | 720 | 420 |

* Note: Measurement of bending strength was based on ASTM D-790.

Table 2

| Test No. | | 8 | 9 | Reference Example 2 |
|---|---|---|---|---|
| Polybutadiene Derivative | | a | b | A-8 |
| Conditions of Irradiation | Voltage | 2.0 MeV | 2.0 MeV | 2.0 MeV |
| | Current | 1 mA | 2 mA | 5 mA |
| | Dose Rate | 0.1 Mrad/sec | 0.2 Mrad/sec | 0.5 Mrad/sec |
| | Linear Velocity | 4.5 cm/sec | 4.5 cm/sec | 4.5 cm/sec |
| | Distance between Radiation Source and Exposed Matter | about 20 cm | about 20 cm | about 20 cm |
| | Total Radiation Dose | 3 Mrad | 6 Mrad | 10 Mrad |
| Results of Test | Film Thickness | 20μ | 20μ | 20μ |
| | Pencil Hardness | 3H | 3H | 2B |
| | Bending Strength (2 mmφ) | 0 | 0 | X |
| | Du Pont Shock Resistance Front Side | 50 cm | 50 cm | 30 cm |
| | Du Pont Shock Resistance Reverse Side | 50 cm | 50 cm | 10 cm |

Note 1.
Test Method
Pencil Hardness: TIS K-5651, used Mitsubishi UNI Pencil
Bending Strength: TIS-5400
Du Pont Shock Resistance: ½". 500 g
Note 2.
Marks for Judgement
0 Nothing unusual in painted film
X Cracking and/or Peering in Painted Film Table 3

| Test No. | | 10 | Reference Example 3 |
|---|---|---|---|
| Polybutadiene Derivative | | a | A-7 |
| Vinyl Compound | | Styrene 20% Acrylic Acid 2% | Styrene 20% Acrylic Acid 20% |
| Conditions of Irradiation | Voltage | 2.0 MeV | MeV |
| | Current | 1 mA | 5 mA |
| | Dose Rate | 0.1 Mrad/sec | 0.5 Mrad/sec |
| | Linear Velocity | 4.5 cm/sec | 4.5 cm/sec |
| | Distance between Radiation Source and Exposed Matter | about 20 cm | about 20 cm |
| Dose | Total Radiation | 3 Mrad | 15 Mrad |
| Tensile Shearing Strength | Just After Curing | 120 kg/cm² | 76 kg/cm² |
| | After Heating at 180°C for 30 hours | 105 | 58 |

What we claim is:

1. A process for preparing a polybutadiene derivative curable by means of an ionizing radiation, which comprises reacting a polymeric butadiene selected from a butadiene homopolymer, a butadiene copolymer and a mixture thereof, said polymeric butadiene having a number-average molecular weight of about 200–100,000 and containing a functional group having an active hydrogen and not less than about 30 percent of the butadiene units in said polymeric butadiene being 1,2-bond, with an isocyanate compound having an unsubstituted or substituted vinyl group, in the proportion of said isocyanate compound providing not less than about 0.5 equivalent of the isocyanate group per said polymeric butadiene providing 1 equivalent of the active hydrogen.

2. A novel polybutadiene derivative curable by means of an ionizing radiation, the structure of which is represented by a reaction product of a polymeric butadiene selected from a butadiene homopolymer, a butadiene copolymer and a mixture thereof, said polymeric butadiene having a number-average molecular weight of about 200–100,000 and containing a functional group having an active hydrogen and not less than about 30 percent of the butadiene units in said polymeric butadiene being 1,2-bond, with an isocyanate compound having an unsubstituted or substituted vinyl group, in the proportion of said isocyanate compound for the amount of providing not less than about 0.5 equivalent of the isocyanate group per said polymeric butadiene for the amount of providing 1 equivalent of the active hydrogen.

3. The product of claim 1 used as a cured resin product.

4. The product of claim 2 used as a cured resin product.

5. The product of claim 1 used as an ingredient of a paint composition.

6. The product of claim 2 used as an ingredient of a paint composition.

7. The product of claim 1 used as a bonding agent.

8. The product of claim 2 used as a bonding agent.

* * * * *